H. L. FISHER.
MACHINE FOR PICKING COTTON FROM THE PLANT.
APPLICATION FILED JUNE 15, 1912.

1,262,030.

Patented Apr. 9, 1918.
10 SHEETS—SHEET 1.

H. L. FISHER.
MACHINE FOR PICKING COTTON FROM THE PLANT.
APPLICATION FILED JUNE 15, 1912.

1,262,030.

Patented Apr. 9, 1918.
10 SHEETS—SHEET 3.

H. L. FISHER.
MACHINE FOR PICKING COTTON FROM THE PLANT.
APPLICATION FILED JUNE 15, 1912.

1,262,030.

Patented Apr. 9, 1918.
10 SHEETS—SHEET 5.

Witnesses
Martin H. Olsen
Robert Dobberman

Inventor
Harry L. Fisher
By Victor Hilton Davis Macaul
Attys.

H. L. FISHER.
MACHINE FOR PICKING COTTON FROM THE PLANT.
APPLICATION FILED JUNE 15, 1912.

1,262,030.

Patented Apr. 9, 1918.
10 SHEETS—SHEET 7.

H. L. FISHER.
MACHINE FOR PICKING COTTON FROM THE PLANT.
APPLICATION FILED JUNE 15, 1912.

1,262,030.

Patented Apr. 9, 1918.
10 SHEETS—SHEET 10.

UNITED STATES PATENT OFFICE.

HARVEY L. FISHER, OF CHICAGO, ILLINOIS, ASSIGNOR TO DONALDSON & FISHER COMPANY, OF CHICAGO, ILLINOIS, A CORPORATION OF ARIZONA.

MACHINE FOR PICKING COTTON FROM THE PLANT.

1,262,030.

Specification of Letters Patent.

Patented Apr. 9, 1918.

Application filed June 15, 1912. Serial No. 703,919.

*To all whom it may concern:*

Be it known that I, HARVEY L. FISHER, a citizen of the United States, residing at Chicago, in the county of Cook and State of Illinois, have invented certain new and useful Improvements in Machines for Picking Cotton from the Plant, of which the following is a specification.

The essential requisites of a successful cotton picker are that it shall rapidly gather substantially all the ripe cotton upon the plant upon which it operates without in any material respect injuring the plant or the unripe cotton bolls. With these requirements in view, I have devised a machine which is adapted to be drawn or driven along a row of the plants, which are caused to enter a channel or passage extending longitudinally of the machine, into which project one or more series of picker fingers which are so closely placed together that it is impossible for an open cotton boll to escape them, and which grasp the cotton with which they come into contact and withdraw into a chamber or chambers with it where the cotton is removed from the picker and suitably stored. In the accompanying drawings and the following specification I have shown and described in detail two different forms of machines, both of which embody my invention in certain of its features, but it is to be understood that the detailed disclosure of apparatus is for the purpose of exemplification only, and that my invention is not limited thereto or to any particular features thereof except in so far as they are stated in the following claims.

In the accompanying drawings

Figure 1:
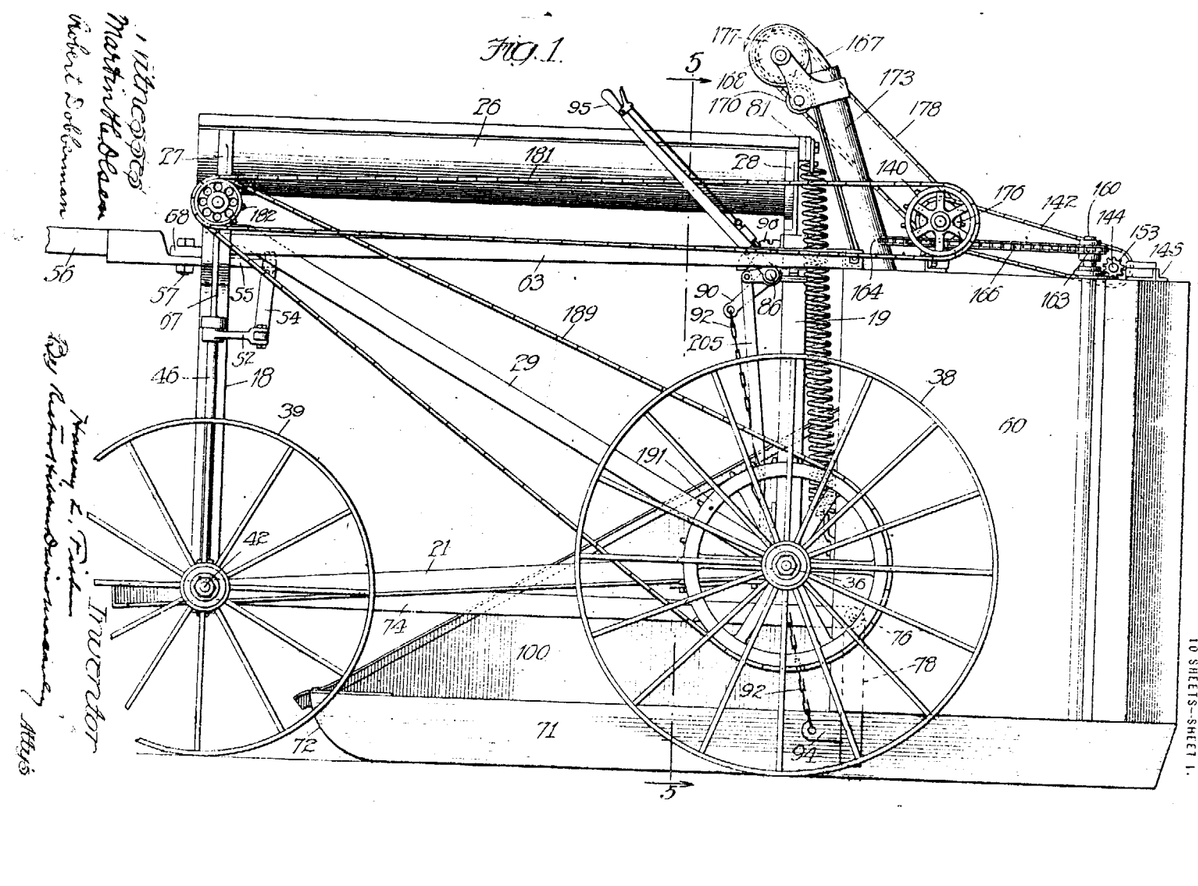
Figure 1 is a side elevation of my preferred form of cotton picker.
Figure 2:
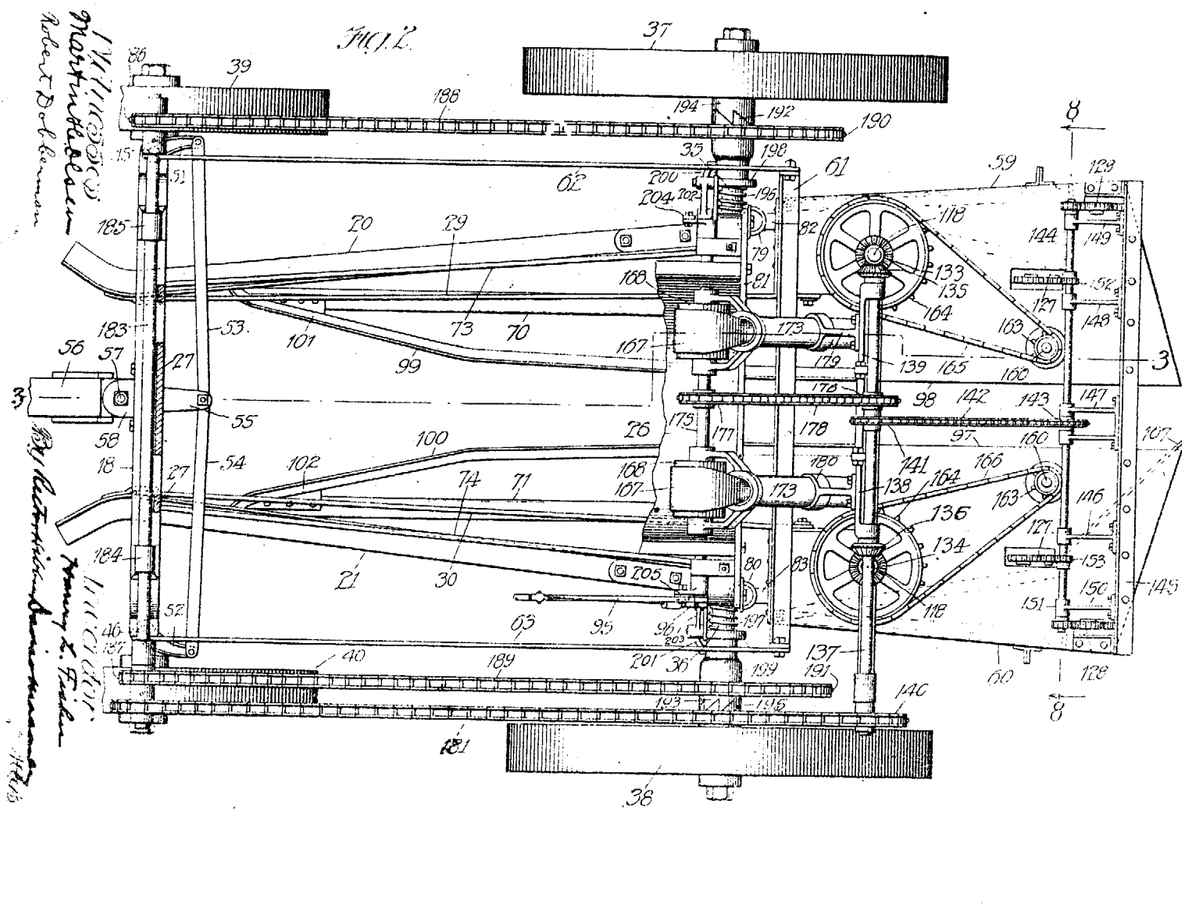
Fig. 2 is a plan view thereof.
Figure 4:
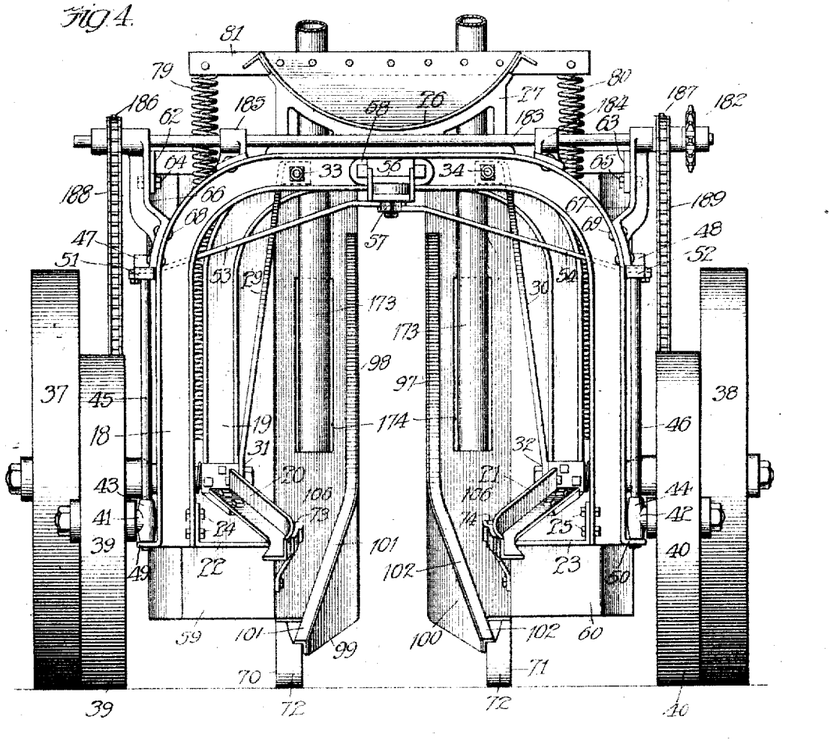
Fig. 4 is a front elevation of the machine.
Figure 5:
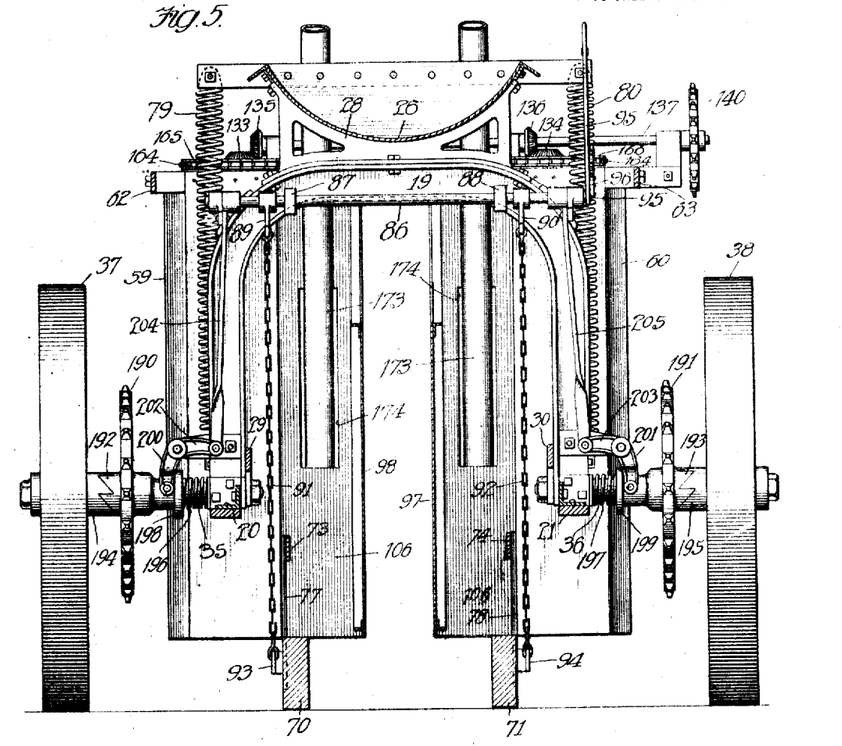
Fig. 5 is a vertical transverse section upon the line 5—5 of Fig. 1.

Referring now to the preferred form and more particularly to Figs. 1, 2 and 4, of the drawing, it will be seen that my apparatus comprises a vehicle by which the cotton picker is carried and the cotton picking mechanism, *per se*, and that the latter is driven from the wheels of the former which in the present instance is arranged to be drawn by animals, though obviously the machine might be motor driven and the motor employed also for operating the cotton picking mechanism. But in any event it is desirable for a reason which will appear that the speed at which the cotton picking mechanism is driven have a definite relation to the speed with which the vehicle is propelled. It is essential for the operation of the device that it provide a free passage for the plants through the picker mechanism, and with this in view the carriage is built to straddle a row of cotton plants, the wheels which are four in number being preferably spaced apart laterally a sufficient distance to permit the machine to straddle a row of cotton to be picked without at the same time coming in contact with the adjacent rows on either side thereof. The main frame of the vehicle consists of a pair of metal arches 18, 19, formed preferably of light I beams, and connected at their lower ends by longitudinally extending L beams 20, 21, of steel which incline downwardly and converge toward the front of the machine to the plane of the forward arch and then diverge somewhat as shown particularly in Figs. 2 and 4. These longitudinal struts or braces are not secured directly to the forward arch but are spaced from the lower ends thereof toward the center of the machine, and connected to the lower ends of the arch by brackets 22, 23, which are bolted at 24, 25 to the flange of the I beam and secured in any suitable manner to the under side of the longitudinal struts. As shown more particularly in Figs. 1 and 4 the arches are connected at their tops by a curved metal pan 26 extending longitudinally of the machine between the arches, and supported from the latter by cast brackets 27, 28 bolted to the arches and the pan respectively. The structure is further strengthened by a pair of diagonal struts 29, 30 which are bolted at their lower ends to the ends of the rear arch as at 31, 32 and at their upper ends by bolts 33, 34 to the transverse or horizontal member of the forward arch. In the lower ends of the rear arch are fixed journals or spindles 35, 36 which extend outwardly therefrom on opposite sides of the machine and receive the rear wheels 37, 38 which are journaled thereon. The front wheels 39, 40 are journaled upon stub shafts 41, 42 which are forged integral with sleeves 43, 44, rigidly secured upon vertical shafts 45, 46, revolubly mounted at their upper ends in bearings 47, 48 and at their lower ends in outwardly turned ears 49, 50, preferably formed by bending the outer flange of the I beam at right angles. To provide for steering the machine the shafts 45, 46 are provided at or near their respective upper ends with arms 51, 52 which extend rearwardly and are connected by links 53, 54 respectively with an extension 55 upon the rear end of the tongue 56 of the vehicle which is journaled at 57, to a bracket 58, bolted to the front arch. By this structure as will readily be seen the wheels will swing in the direction in which the tongue of the vehicle is turned so that the apparatus will readily follow the draft animals by which it is drawn.

Figure 6:
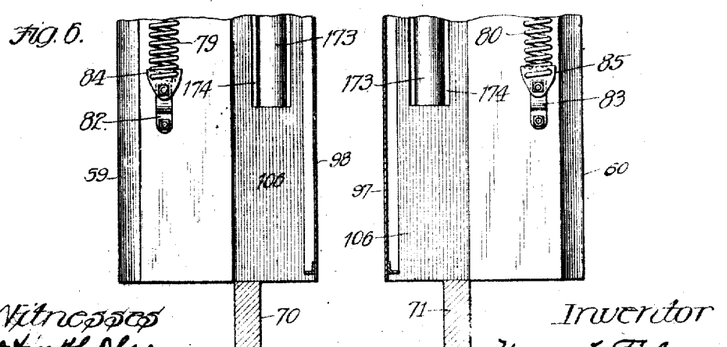
Fig. 6 is a similar view of the lower portion of the machine with the vehicle frame and the wheels omitted to show a feature not shown in Fig. 5.

The cotton picker mechanism is contained in a pair of housings or chambers 59, 60 (see particularly Fig. 2) mounted upon the rear of the machine, but not rigidly attached thereto. On the contrary, the chambers referred to are connected at their forward upper edges to an L beam 61 extending transversely of the machine at about the level of the upper arch which in turn is pivoted to a pair of arms 62, 63 swinging in a vertical plane, extending to the front end of the machine and there bolted as at 64, 65 to the brackets 66, 67 which are bolted to the forward arch as at 68, 69. At their lower ends the chambers 59, 60 are supported upon longitudinally extending skids or runners 70, 71, which are adapted to engage or just clear the surface of the ground and are relieved or bowed upwardly as at 72 at their forward ends to enable them to rise over or crush down any slight obstruction. The lower ends of the chambers are connected to the longitudinally extending links 20, 21, near their forward ends by means of the longitudinally extending links 73, 74 which are pivoted at 75, 76 to uprights 77, 78 arising from the runners and rigidly secured thereto. The full weight of the runners and cotton picking mechanism however is not permitted to be borne by the former but is supported in the main by a pair of stout springs 79, 80 which are connected at their upper ends to a transverse bar 81 upon the rear edge of the trough or receptacle 26 and at their lower ends to brackets 82, 83 upon the forward faces of the picker housings, the lower ends of the springs being engaged by perforated plates 84, 85 which are pivoted upon the brackets, as shown more particularly in Figs. 1 and 6.

When the machine is not operating to pick cotton, and more particularly when it is being moved from place to place, it is desirable to lift the cotton picking mechanism and the skids or runners free from the ground and for this purpose I have provided a transverse shaft 86, which is journaled at 87, 88 to the forward face of the rear arch, and carries a pair of rigid arms 89, 90 keyed thereon, which arms are connected by means of lifting chains 91, 92 to ears 93, 94 upon the skids. The shaft is further provided with an operating lever 95 having a catch 95' engaging a rack 96 by which the lever may be retained when it has been turned to lift the picker mechanism and skids, and hold them in raised position. The shaft 86 is further provided with connections to be described later on for throwing the cotton picker mechanism out of gear with the rear wheels which normally drive it at the same time that the picker mechanism is raised.

The structure and operation of the cotton picker mechanism of my preferred form of machine will next be described in connection more particularly with Figs. 7 to 15 inclusive. We have seen that the picker mechanism is mainly inclosed in a pair of housings or chambers having a free passage between them for the cotton plants of the row being treated, the inner or proximate walls 97, 98 of the chambers being preferably smooth equidistant and unobstructed throughout to permit the ready passage of the plant between them (see Figs. 8 and 9). These walls are furthermore continued forwardly beyond the front wall of the chambers in the form of triangular slightly diverging wings 99, 100 of sheet metal outwardly flared at their forward ends and falling away on an incline from the front walls of the chambers to the forward ends of the skids or runners to which they are connected by means of the angle irons 101, 102 by which the upper edges of the wings are reinforced. The purpose of these wings is obviously to fold or bunch together the transversely extending branches of the cotton plant to such extent as is necessary to enable it to pass through the space between the picker chambers. But the latter is made sufficiently wide to avoid the necessity of folding the plants to an extent which would be injurious thereto or break the branches.

In view of the fact that the bolls on the plants do not all mature simultaneously, it is an essential of a successful cotton picking machine that it not only gather substantially all of the ripe cotton but that it should inflict no substantial injury upon the plant or the unripened bolls. With these requirements in view I have provided my cotton picking machine with a series of cotton picking spindles or fingers which are alternately thrust into the cotton plants and rapidly rotated to pick the cotton from the boll and then withdrawn to allow the plants to pass, the cotton being removed from the fingers during the brief period in which they are withdrawn. The action of the pickers or fingers is best illustrated in Figs. 7, 8, 12, and 13. Since the construction of the picker mechanism is substantially the same on both sides of the machine it will suffice to refer to one side only in the description thereof.

Figure 7:
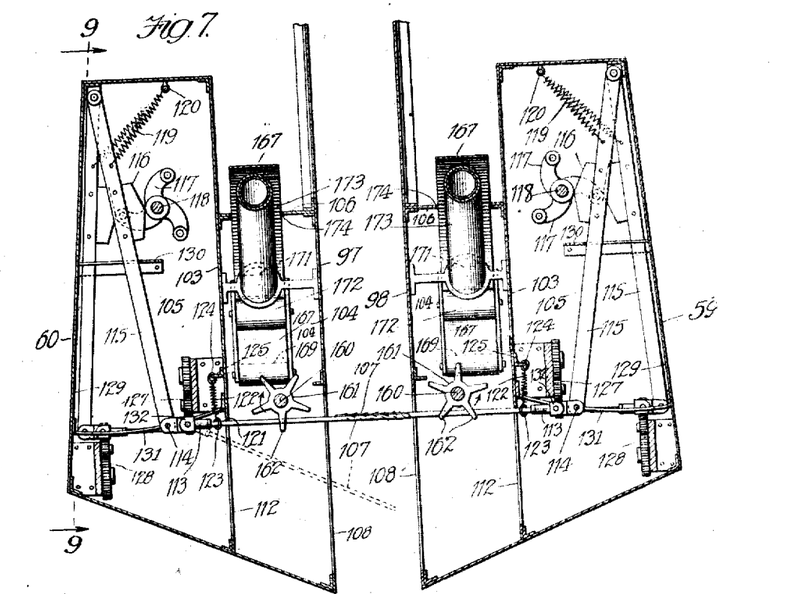
Fig. 7 is a sectional plan upon the line 7—7 of Fig. 3.
Figure 8:
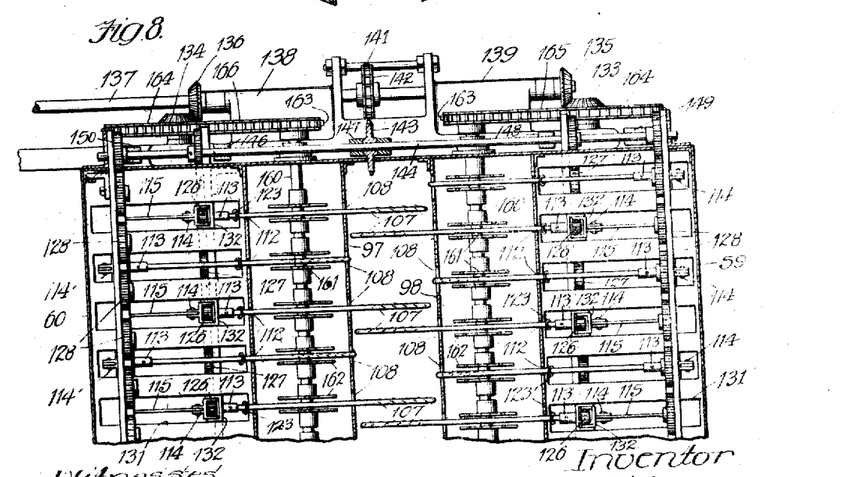
Fig. 8 a vertical transverse section on the line 8—8 of Fig. 2, certain parts however being shown in elevation.
Figure 9:
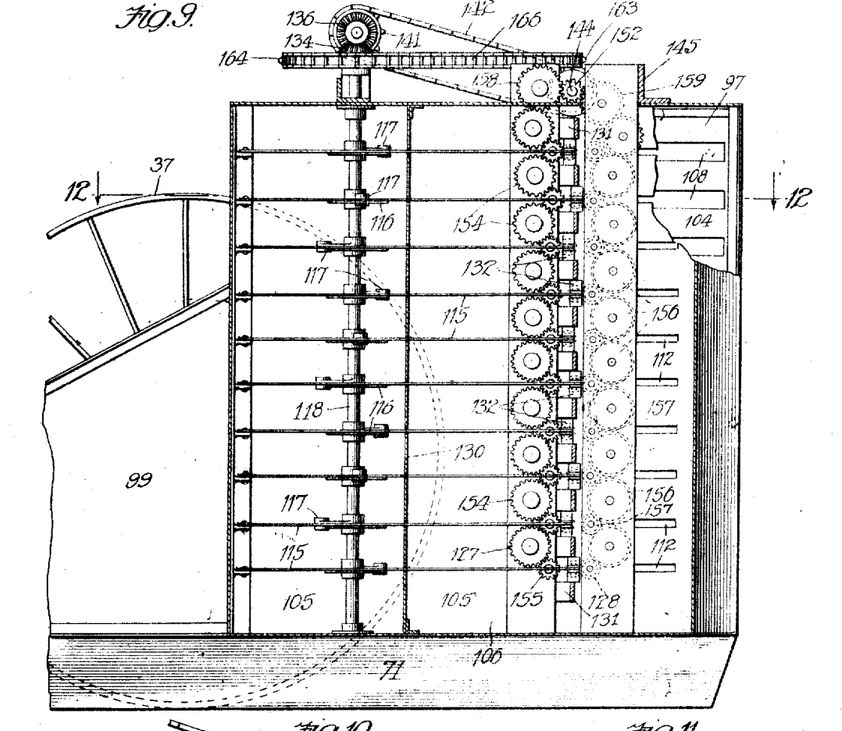
Fig. 9 is a view mainly in longitudinal section but partially in elevation through one of the picker boxes upon the line 9—9 of Fig. 7.
Figures 10, 11:
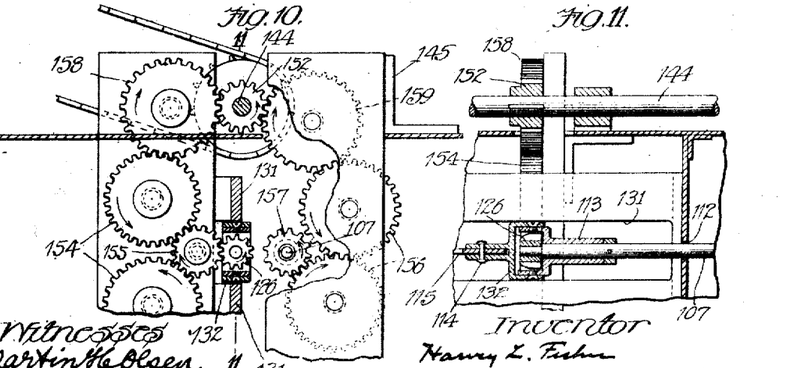
Fig. 10 is a fragmentary view in vertical section upon line 10—10 of Fig. 12 looking in the direction of the arrows, parts being broken away to reveal the mechanism behind them.
Fig. 11 is a vertical section upon the line 11—11 of Fig. 10.
Figures 12, 13, 14, 15:
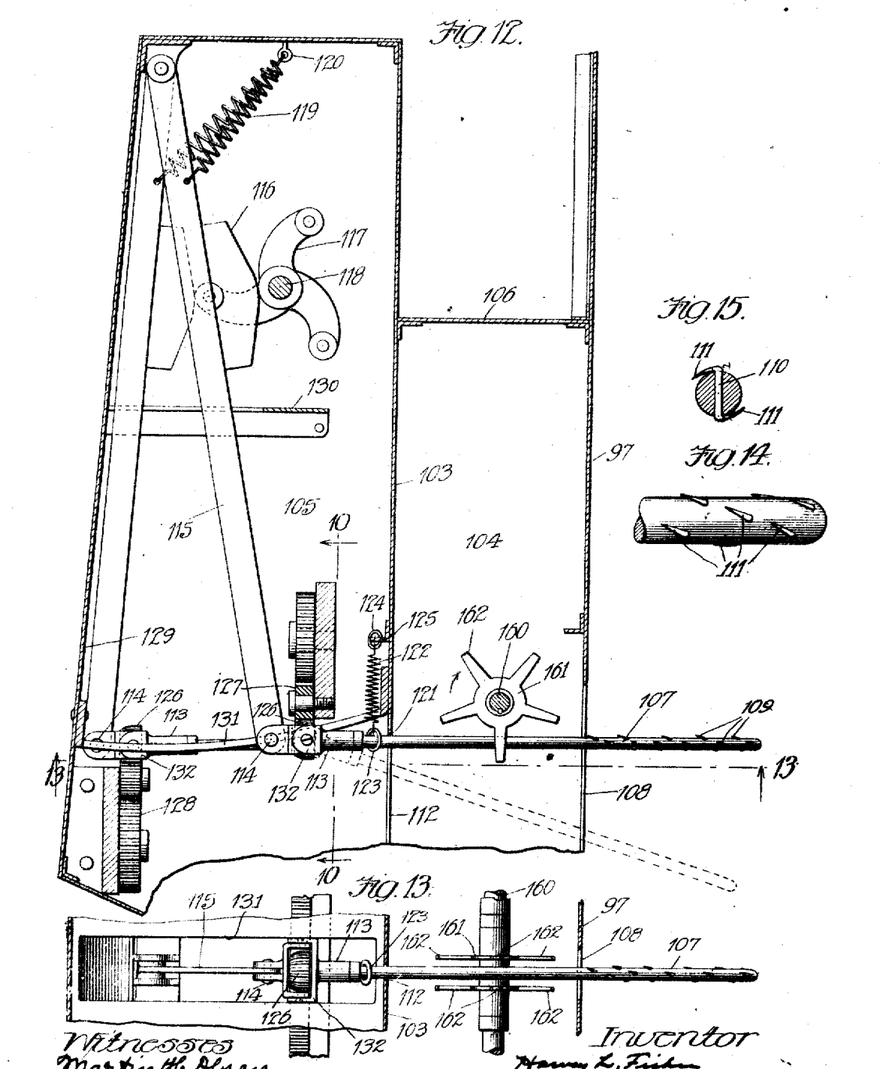
Fig. 12 is an enlarged horizontal sectional detail upon the line 12—12 of Fig. 9.
Fig. 13 is a similar detail but fragmentary and in vertical section upon the line 13—13 of Fig. 12.
Figs. 14 and 15 are enlarged views of the picker, Fig. 14 being a fragmentary elevation, and Fig. 15 a transverse section.

As shown in Fig. 7 and 12, the chamber is divided longitudinally by a partition 103 into two compartments, one of which 104 is adapted to receive the cotton and provided with mechanism for stripping it from the spindles or fingers and the other 105 contains the mechanism for giving the spindles the required movement. As shown the compartment 104 is shortened toward the front as compared with compartment 105, the front wall thereof being shown at 106. The picker fingers 107 extend horizontally and are adapted to be thrust through horizontal slots 108 formed in the adjacent walls of the picker chambers and are arranged in a vertical series covering the entire height of the cotton plant upon which it is intended to operate, and extend when thrust out substantially across the passage between the chambers in a vertical plane, the fingers upon one side alternating with those upon the other side. The outer ends of the picker fingers are or may be cylindrical and are provided with picker points or barbs 109 for engaging the cotton, and in the particular construction shown the fingers may be formed of wood or metal rods, through diametrical openings in which are inserted short sections of rod or wire 110, having their ends which extend beyond the surfaces of the fingers bent over and sharpened as at 111 (see Fig. 15). At its inner end each picker finger extends through a horizontal slot 112 in the partition 103 and is journaled in a sleeve 113 which is pivoted at 114 to a radius arm 115. The latter is provided with a bearing surface 116 which is engaged by a roller cam 117 of a series mounted on a shaft 118 for the purpose of moving the arm in one direction, the arm being returned in the opposite direction by a spring 119 connected at its opposite ends respectively to the arms and a hook 120 upon the front wall of the casing or chamber. It will be apparent that the revolution of the shaft 118 will operate through the arm 115 to cause the finger 107 to be thrust into and out of the channel or passage between the adjacent walls of the picker chamber. In order, however, to normally maintain the picker fingers in position, it is held against the inner end 121 of the groove 112 by a spring 122 having at one end a ring 123 which surrounds the finger and at the other a ring 124 attached to a bracket or hook 125. This construction is obviously such that the spring will yield when the finger encounters an obstacle and allow the latter to swing backward to relieve it until it is withdrawn from the plant passage and permits the object to pass. In case the fingers are brought in contact with a cotton plant or unripe boll with a pressure which might endanger the plant, they yield and thereby avoid injury to either the plant or the machine. In addition, however, to the longitudinally reciprocating motion, each finger in my preferred machine is given a rotation in a direction to cause the barbs 111 to penetrate a mass of cotton when the finger is thrust into the passage and a second movement of rotation but in the reverse direction when the finger is withdrawn from the passage. For this purpose the picker finger is provided on its inner end with a gear 126, which is adapted and arranged when the finger is projected to engage a gear of the series 127 near the intermediate wall or partition of the picker chamber and to engage a second series of gears 128 arranged on a support near the outer wall 129 of the chamber when the picker is withdrawn within the casing or chamber. In a plane about midway the length of the arms 115 the compartment 105 is provided with a slotted guide wall 130 for the swinging arms 115 and at their outer ends the arms are provided with a curved slotted guide wall 131 which spaces them apart and keeps them in position. The gear 126 on the spindles which are inclosed in housings 132 open at the sides for the purpose, are thus accurately guided into mesh with the sets of co-acting gears 127 and 128 respectively. The cam shafts 118 in the respective casings or chambers project through the tops thereof in which they are journaled, and are provided upon their upper ends with bevel gears 133 and 134 which mesh with the respective members of a pair of bevel gears 135 and 136 upon a transverse shaft 137 which is mounted in suitable housings 138, 139 and is provided at one end with a sprocket 140 for driving the same. The trains of gears 127, 128 for giving rotation to the series of spindles in their inner and outer positions are driven from the shaft 137, upon which is mounted for the purpose a sprocket 141, which receives a sprocket chain 142, and thereby transmits motion through a second sprocket 143, to a transverse shaft 144 mounted upon the top of the chambers or casings near their rear ends (see Fig. 2). An angle iron 145 is riveted across the tops of these chambers at their rear to secure them together and is provided with brackets 146, 147, 148, 149, 150 which are formed with bearings 151 for the transverse shaft 144. The position of this last named shaft is intermediate the series 127 and 128 when viewed from above and it carries pinions 152, 153 which engage and mesh with the terminal gears of each of the two series in both chambers. This arrangement of gearing is best shown in Figs. 9, 10 and 11. The series of gears 127 in either chamber, by which the spindles are driven in their projected position, each consists of a series of larger gears 154 and intermediate pinions 155, the latter of which not only transmit motion from one larger gear to the next, but also are engaged each by the pinion of a picker spindle to rotate the latter. The gear series 128 is likewise composed of large gears 156 and pinions 157, operating as in the series 127, and motion is imparted to the gears of the two series from the transverse shaft 144 by its pinions 152 and 153, above mentioned, and the idler spur gears 158, 159 respectively. It will now appear from Figs. 9 and 10 and from the arrows found in the latter figure that the spindles will be rotated in one direction when in mesh with the series of gears 127 and in the reverse direction by the series of gears 128. It is to be understood, however, that the spindles are not all simultaneously projected and simultaneously withdrawn but that this action occurs in accordance with the arrangement of the cams 117 which are shown in the present drawing as arranged in three rows so that one-third of the spindles are projected simultaneously.

The means for stripping the cotton from the spindles when they are withdrawn into the compartments 104 consists in a shaft 160 in each such compartment provided with a series of double star wheels 161 the spokes or projections 162 of which span the several spindles of the series above and below (see Figs. 8 and 12), and being rotated in the direction of the arrow shown in Fig. 12, while the spindle is itself rotating in a direction tending to strip the cotton from its barbs serves to rapidly remove all the cotton from the spindles The means for rotating these shafts, as shown in Fig. 2 of the drawings, consists of sprockets 163, 164 upon the upper ends of these shafts and of the cam shafts 118 respectively and connected by sprocket chains 165, 166.

Figure 3:
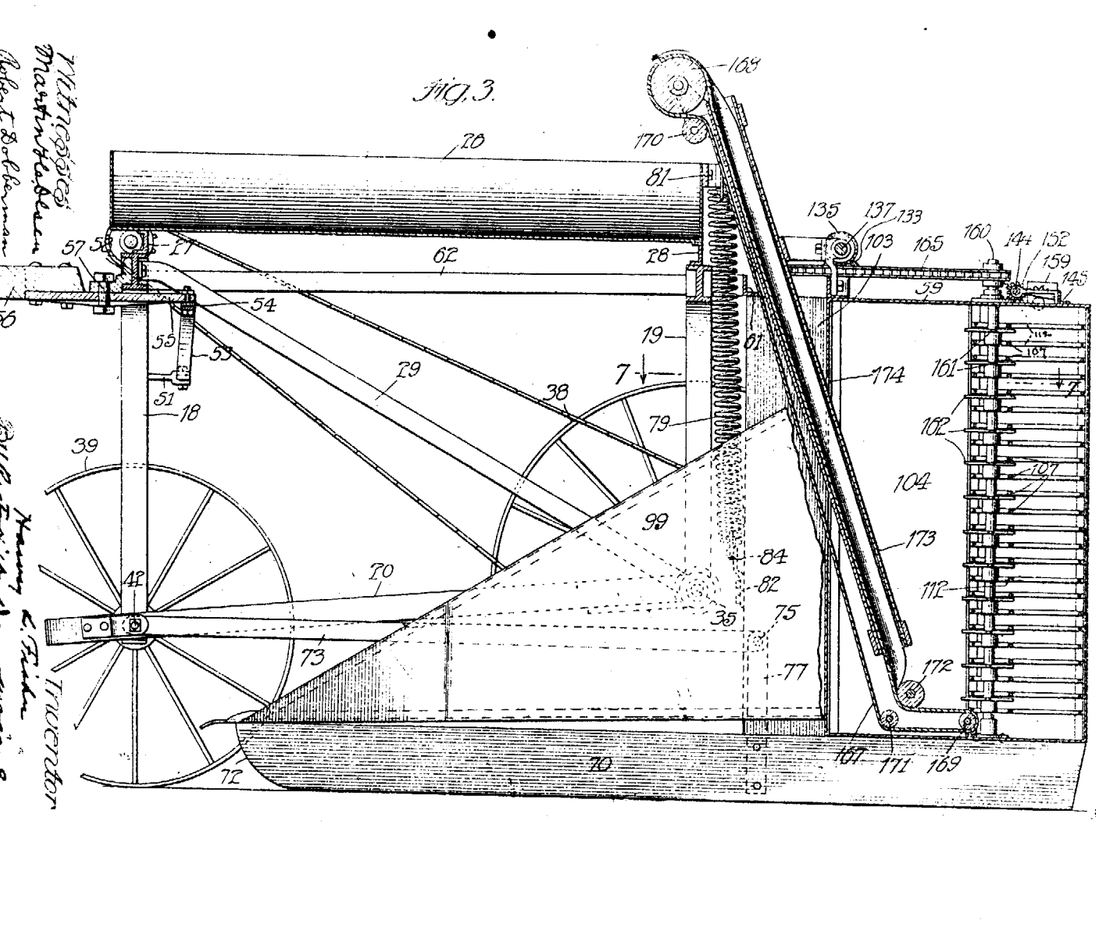
Fig. 3 is a longitudinal vertical section on the broken line 3—3 of Fig. 2, certain parts being omitted for the sake of clearness.

When the cotton is stripped from the spindles by the star wheels it is precipitated into the chamber 104, whence it is conveyed by an endless conveyer 167 as shown more particularly in Fig. 3. This conveyer is in the form of a belt which at its upper end extends around a roller 168 and at its lower end around a roller 169 being guided at intermediate points by the rollers 170, 171 and 172, the latter of which also serves the purpose of compacting or squeezing the air out of the cotton, which is then carried upward by the endless belt through a tube 173, which gives the conveyer a trough-like or tubular form in its passage therethrough. By reason of its compact condition the cotton is readily carried upward through the tube being folded in the belt although the latter may furnish very little roughness or projections to cause the cotton to adhere thereto, and at the upper end of the run of the belt the cotton is discharged therefrom into the longitudinal trough 26 above referred to, where it accumulates for a time and whence it is removed in any suitable manner. At a point 174 as will be seen by a reference to Fig. 3. the forward wall of the compartment 104 is perforated and the conveyer passes therethrough. The roller 168 at the upper end of the endless conveyer forms a driving means for the belt, and is mounted upon a shaft 175, which is common to the rollers of the conveyers of both chambers and is driven from the shaft 137 by sprockets 176, 177 and the sprocket chain 178. At 179, 180 are shown brackets attached to the housing 138, 139 of the shaft 137 and securing the upper ends of the conveyer tubes.

As before stated the transverse shaft 137 bears at one end a sprocket 140, and with this element is engaged a sprocket chain 181 which also meshes with a sprocket 182 on a transverse shaft 183 mounted in brackets 184, 185, 66 and 67 on the forward arch of the vehicle. The shaft 183 also carries a pair of sprockets 186, 187 at opposite ends thereof, and with each of these sprockets engages a sprocket chain 188, 189 which is driven by a sprocket 190, 191, loosely mounted upon the shaft of the rear wheel upon that side of the machine (see Fig. 1). Each of these sprocket wheels is formed on its hub with a ratchet clutch face 192, 193 engaging a similar face 194, 195 upon the hub of the adjacent wheel when in its outer position. It is maintained in this position by a spring 196, 197 between the inner flange of the hub of the sprocket wheel and the outer face of the adjacent end of the rear arch. An annular flange 198, 199 is formed upon the inner end of each sprocket hub, and a roller bearing arm 200, 201 of a bell-crank lever engages the flange, the other end 202, 203 of the lever being connected by a link 204, 205 with an arm 89, 90, heretofore referred to, upon the transverse shaft 86. It will now be seen that when this shaft 86 is rocked in a direction to lift the picking mechanism the sprocket wheels will also be thrown inward to disengage the clutches so that the turning of the road wheels 37, 38 will not affect the sprockets. It is also to be noted that by reason of the ratchet character of the clutch the sprocket will not be turned by the reverse rotation of the traction wheels but will be merely driven in and click past the teeth of the clutch and if one road wheel be driven in a different direction or at a different speed from the other wheel as in making a turn there will be no strain put upon the parts but the forwardly or more rapidly moving wheel will operate the mechanism, the clutch relieving the other wheel.

The operation of the several parts has been described in connection with their construction but will be again briefly described in order to sum up the operative relations of all the mechanisms. The rotation of the road wheels in a forward direction carries the rotation of the sprockets which in turn drive the chains 181 and the shaft 183. The latter through the sprockets 182 drives the chain 181, the sprocket 140 and shaft 137. The bevel gears 135, 136 on the latter through the bevels 133, 134 drive the crank shafts for projecting and retracting the picking spindles, while the sprocket 141 on shaft 137, through the chain 142 and sprocket 143, drives the transverse shaft 144 which in turn through its spur gears 152, 153 drives the series of gears 127, 128 which operate the spindles in opposite directions. The latter are rapidly thrown in and out by the operation of the crank shafts on the radius arms which carry the spindles and alternately receive the reverse rotations above referred to. Each ripe cotton boll must come into contact with at least one of the spindles which by its rotation winds up the cotton thereon. The spindle is then withdrawn within its casing and rotated in the opposite direction which tends to unwind the cotton, and this operation is rendered effective by the stripping star wheels, the shafts of which are rotated from the cam shafts by the sprockets 163, 164. This cotton precipitated into the compartments 104 by the star wheels is compacted and elevated by the endless conveyers 168 and cast into the pan 26. The entire operation of picking cotton is mechanically performed, without resorting to any manipulation whatever, and the spindles, by their rapid in and out motion and their close arrangement across the mouth or outlet of the plant passage between the chambers, are brought into operative relation to all the ripe cotton on any plant over which the machine is drawn, while the light spring tension upon the spindles permits them to give way before a plant sufficiently to prevent injury thereto before the spindle is withdrawn into its chambers and out of the cotton plant.

As heretofore stated the particular form of machine above described is that preferred by me and is found to answer the requirements of a successful cotton picking machine more fully than the form of device to be now described, though the latter is also useful for the purpose and possesses certain advantages which will appear from the following description.

Figure 16:
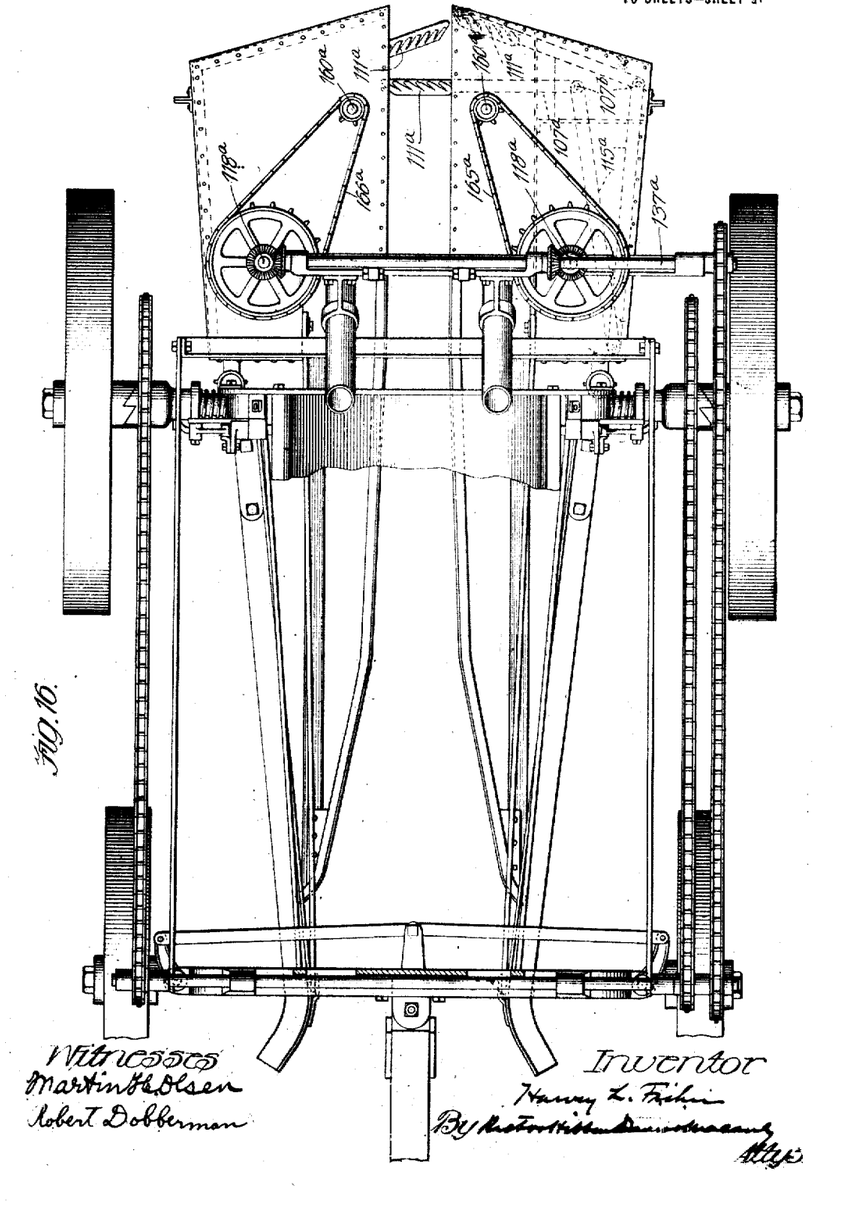
Fig. 16 is a plan view of another form of my invention.
Figure 17:
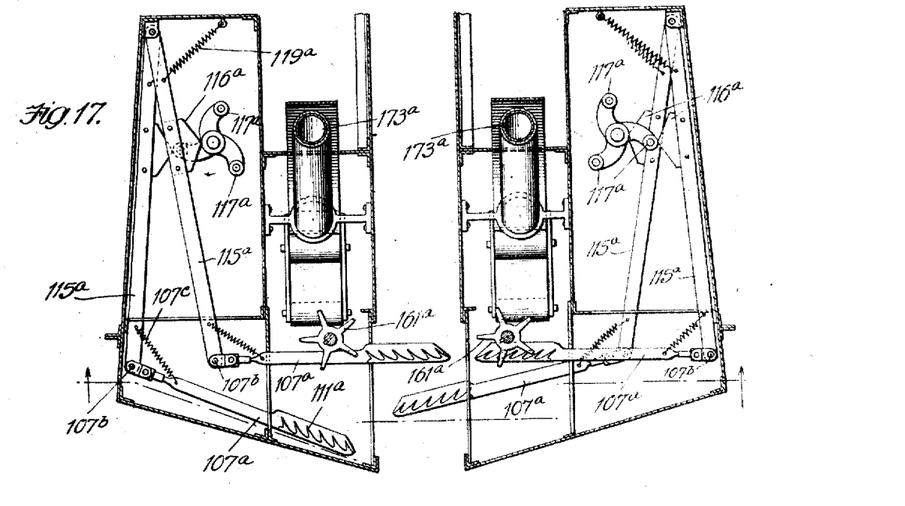
Fig. 17 is a horizontal sectional view of the same similar to Fig. 7.
Figure 18:
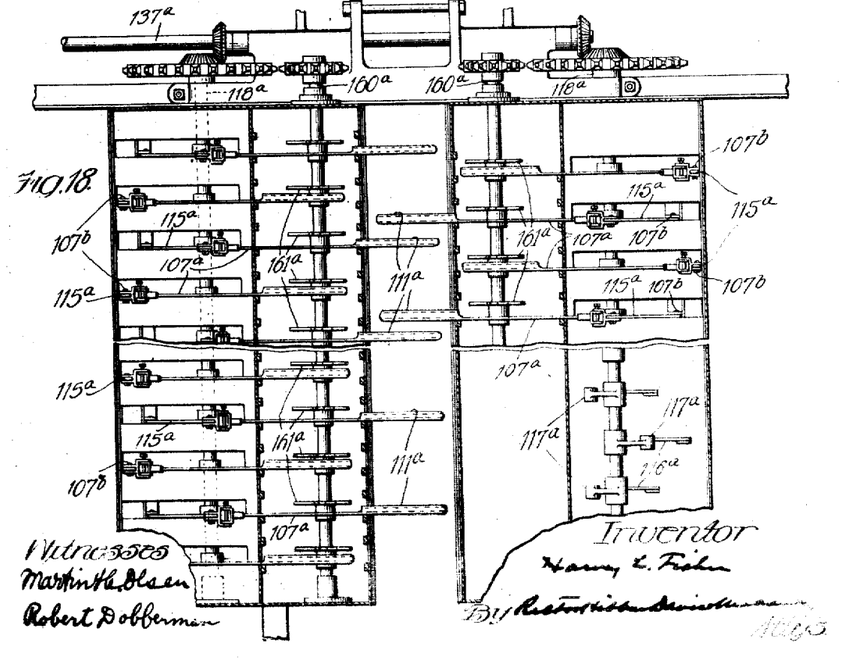
Fig. 18 is a vertical sectional view of this form similar to Fig. 8.
Figure 19:
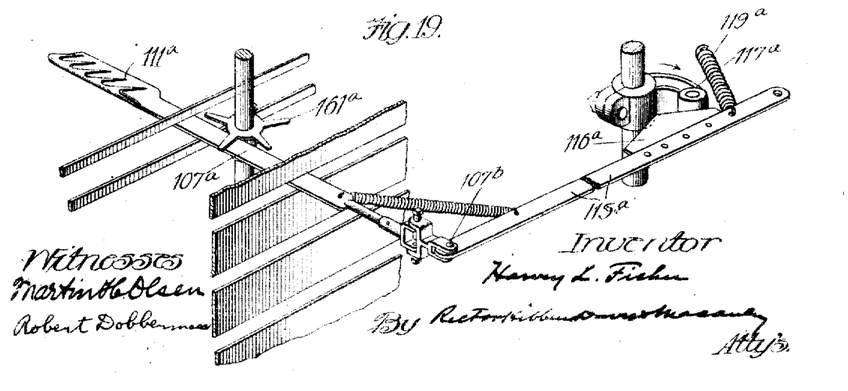
Fig. 19 is a perspective illustrating the operation of this form of the device. The several parts are identified by the same symbols of reference throughout the several views.

In the second modification the wagon or truck on which the picker is mounted, the means for driving the picker mechanism and the form and arrangement of the picking mechanism are as heretofore described except in the particulars to which attention will now be drawn. The most noteworthy feature in which the present machine differs from that above described relates to the character of the picker fingers. Instead of being rotated as heretofore described, these fingers have only a longitudinally reciprocating swinging motion into and out of the path of the cotton plant, the rotary motion being entirely dispensed with. As shown in Fig. 16 the picker spindles 107$^a$ are pivoted at 107$^b$ to the swinging arms 115$^a$ which are urged in one direction by springs 119$^a$ and driven against the tension of the springs in the other direction by cam rollers 117$^a$ coöperating with bearing surfaces 116$^a$ upon the arms. Springs 107$^c$ span the angles between the picker fingers and their respective arms and serve to hold the fingers normally in a position which is transverse to the passage. The fingers are provided with barbs 111$^a$ which engage the cotton as the fingers are retracted and draw it within the casing and into the range of action of the star wheels 161$^a$ by which the cotton is removed from the fingers as in the earlier described machine. The conveyers 173$^a$ are substantially similar to those previously described and the star wheel shafts 160$^a$, 160$^a$ are driven by sprocket chains 165$^a$, 166$^a$ from the cam shafts 118$^a$ which in turn are driven from a transverse shaft 137$^a$ as in the former machine. The spindles, however, having no rotary motion the shafts and gears provided in the earlier described machine for this purpose are here dispensed with.

The above described machines are fairly illustrative of the present invention. But it is to be here repeated that I am not limited to the features found in either or both the specific forms of machines so described, but the scope of my invention is defined by the following claims.

I claim:

1. In a device of the class described, a carriage, a picker mechanism, substantially horizontal links connecting the picker mechanism to the carriage and permitting vertical movement, springs between the picker mechanism and carriage for partially supporting the former, and manually operative means for raising the picker mechanism.

2. In a device of the class described, a carriage, picker mechanism, substantially horizontal links connecting the picker mechanism to the carriage and permitting vertical movement, springs between the picker mechanism and carriage for partially supporting the former, a transverse shaft and connections therefrom to the picker mechanism for raising the latter, and a handle on the shaft.

3. In a device of the class described, a carriage, a picker mechanism, runners connected thereto, connections between the carriage and picker mechanism permitting relative vertical motion, and springs partially supporting the weight of the picker mechanism.

4. In a device of the class described, a carriage, picker mechanism mounted thereon but having vertical movement with relation thereto, runners on the picker mechanism, substantially horizontal links by which the picker mechanism is joined to the carriage, springs for partially supporting the picker mechanism from the carriage, a transverse shaft having a handle and connections to the picker mechanism for raising the latter.

5. In a machine of the class described, a housing having a series of openings in a wall thereof, picker fingers adapted and arranged to be reciprocated longitudinally through said openings, means for reciprocating the picker fingers, and yielding means for normally holding the fingers in a position substantially perpendicular to the wall through which they project.

6. In a machine for picking cotton, a housing having a series of horizontal slots in a wall thereof, a series of picker fingers adapted and arranged to be projected and retracted through the slots, means for reciprocating the picker fingers, and yielding means adapted to normally hold the fingers substantially perpendicular to said wall.

7. In a picker mechanism, a housing having a series of openings in a wall thereof, a series of picker fingers adapted and arranged to be projected and retracted through the openings, a series of horizontal swinging arms upon which the picker fingers are individually mounted, and means for swinging the arms.

8. In a machine for picking cotton, a housing having a series of horizontal slots through a wall thereof, picker fingers adapted and arranged to be projected and retracted through the slots, horizontally swinging arms on which the picker fingers are pivoted, and yielding means normally holding the picker fingers in a position substantially perpendicular to said wall.

9. In a cotton picking machine, a housing having a series of horizontal slots in a wall thereof, a series of picker fingers adapted and arranged to be projected and withdrawn through the slots, a series of horizontally swinging arms to which the fingers are connected, springs normally tending to project the fingers, and a cam shaft having a series of cams coacting with the swinging arms to retract the fingers.

10. In a cotton picking machine, a housing having a series of horizontal slots in a wall thereof, a series of picker fingers adapted and arranged to be projected and retracted through said slots, a series of swinging arms to which the picker fingers are pivoted, means for swinging the arms, and a series of springs connected to the several picker fingers and yieldingly holding the same in a position substantially perpendicular to said wall.

11. In a cotton picking mechanism, a housing having a series of openings in a wall thereof, a series of picker fingers adapted and arranged to be projected and retracted longitudinally through said openings, means for projecting and retracting said fingers, and means for rotating the fingers when projected and other means for rotating the fingers when retracted.

12. In a cotton picking machine, a housing having a series of openings in a wall thereof, a series of picker fingers adapted to be projected and retracted longitudinally through said openings, a series of swinging arms to which the picker fingers are severally connected, and means for rotating the picker fingers.

13. In a machine for picking cotton, a housing having a series of openings in a wall thereof, a series of picker fingers adapted to be projected and retracted through said openings, means for projecting and retracting said fingers, gears fixed on and movable with said picker fingers, and a series of stationary gears with which the gears on said fingers mesh for rotating the latter.

14. In a cotton picking machine, a housing having a series of openings in a wall thereof, a series of cotton picking fingers adapted and arranged to be reciprocated longitudinally through the openings in the walls, means for reciprocating the fingers, gears on the fingers for rotating the same, and a stationary set of gears with which the gears on the fingers are brought into mesh only when the fingers are in their projected position.

15. In a cotton picking machine, a housing having a series of openings in a wall thereof, a series of fingers adapted to be projected through said openings, means for projecting the fingers, gears fixed on and movable with the fingers and a stationary set of gears with which the gears on the fingers mesh when the latter are in retracted position to rotate the same.

16. A cotton picking mechanism comprising a housing having a series of openings in a wall thereof, a series of picker fingers adapted to be reciprocated through said openings, means for effecting such operation of the picker fingers, means for rotating the picker fingers only when fully retracted, and means for stripping the cotton from the fingers during such rotation.

17. In a machine for picking cotton, a housing having a series of openings in a wall thereof, a series of picker fingers adapted and arranged to be reciprocated through said openings, means for effecting said operation, and means within the housing for rotating the picker fingers in one direction when fully projected only and in an opposite direction when fully retracted only.

18. In a machine for picking cotton, a housing having a series of openings in a wall thereof, a series of picker fingers adapted and arranged to be reciprocated through said openings, means for effecting said operation, and means within the housing for rotating the picker fingers in one direction when fully projected only and in an opposite direction when fully retracted only, and means for stripping the cotton from the fingers.

19. In a machine for picking cotton, a housing having a series of openings in a wall thereof, a series of picker fingers adapted and arranged to be reciprocated through said openings, means for effecting said operation, and means within the housing for rotating the picker fingers in one direction when projected and in an opposite direction when retracted, and a rotary shaft having a series of projections adapted to strip the cotton from the fingers when retracted.

20. In a cotton picking machine, a housing having a series of openings in a wall thereof, a series of cotton picking fingers arranged to be projected and retracted through said openings, means for projecting and retracting the picker fingers, gears on the fingers, a series of stationary gears arranged to mesh with said gears on the fingers when projected and turn them in one direction, and a series of gears adapted to mesh with the gears on the fingers when the latter are retracted to rotate the fingers in the reverse direction.

21. In a cotton picking machine, a housing having a series of openings in a wall thereof, a series of cotton picking fingers arranged to be projected and retracted through said openings, means for projecting and retracting the picker fingers, gears on the fingers, a series of stationary gears arranged to mesh with said gears on the fingers when projected and turn them in one direction, a series of gears adapted to mesh with the gears on the fingers when the latter are retracted to rotate the fingers in the reverse direction, and means for stripping the cotton from the fingers when they are retracted.

22. In a cotton picking machine, a housing having a series of openings in a wall thereof, a series of cotton picking fingers arranged to be projected and retracted through said openings, means for projecting and retracting the fingers, gears on the fingers, a series of stationary gears arranged to mesh with said gears on the fingers when projected and turn them in one direction, a series of gears adapted to mesh with the gears on the fingers when the latter are retracted to rotate the fingers in the reverse direction, and a rotary shaft having projections for stripping the cotton from the fingers when they are retracted.

23. In a cotton picking machine, a housing having a series of openings in a wall thereof, a series of cotton picking fingers arranged to be reciprocated through said openings, a series of swinging arms to which said fingers are pivoted, means for swinging the arms, gears on said fingers, gearing arranged and adapted to mesh with said gears and drive them in one direction when the picker fingers are projected and gearing arranged and adapted to mesh with the gears on the fingers when the latter are retracted and rotate them in an opposite direction.

24. In a cotton picking machine, a compartment, means for picking cotton from the plant and transferring it to said compartment, an endless belt conveyer extending from the interior of the compartment to a point outside of same, rollers which support and guide said conveyer and a roller arranged within the compartment and above the belt and adapted to compress cotton passing between the same and the belt.

25. In a machine for picking cotton, a compartment, means for picking cotton and transferring it to the compartment, an endless belt conveyer extending from a point within the compartment to a point outside the same, rollers serving to support and guide the conveyer, and a guide surrounding the run of the conveyer and adapted to roll or fold the walls of the belt.

26. In a cotton picking machine, a housing, means for picking cotton and transferring it to said housing, an endless belt conveyer extending from a point within the housing to a point outside of same, a series of rolls adapted to support and guide the belt, a roll 172 adapted to bear upon the belt and compress the cotton thereof, and a tube 173 to which the belt extends and which is adapted to fold over the walls of the endless belt.

HARVEY L. FISHER.

Witnesses:
 JOHN B. MACAULEY,
 ROBERT DOBBERMAN.